Oct. 7, 1958
H. TIECK
2,854,907
REFLEX TYPE CAMERA
Filed April 19, 1955
2 Sheets-Sheet 2
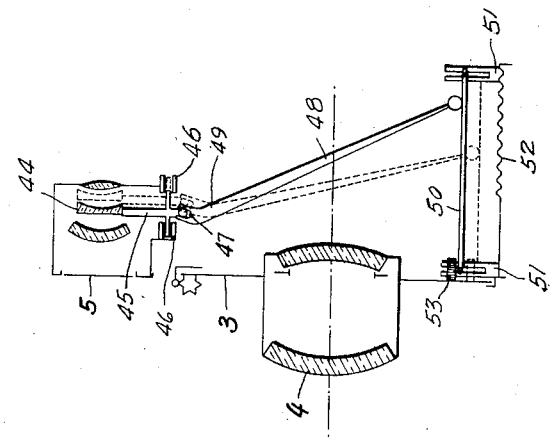
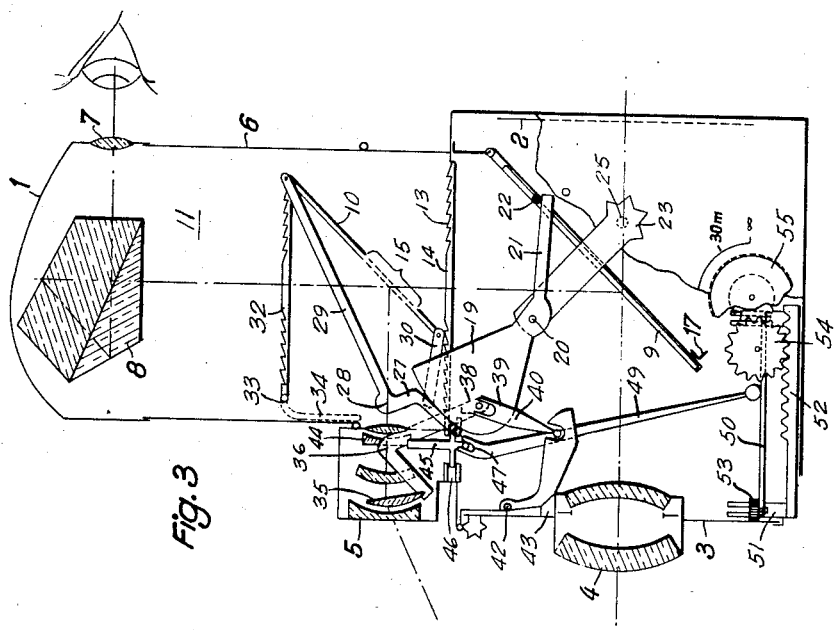
Inventor:
Harry Tieck United States Patent Office 2,854,907
Patented Oct. 7, 1958

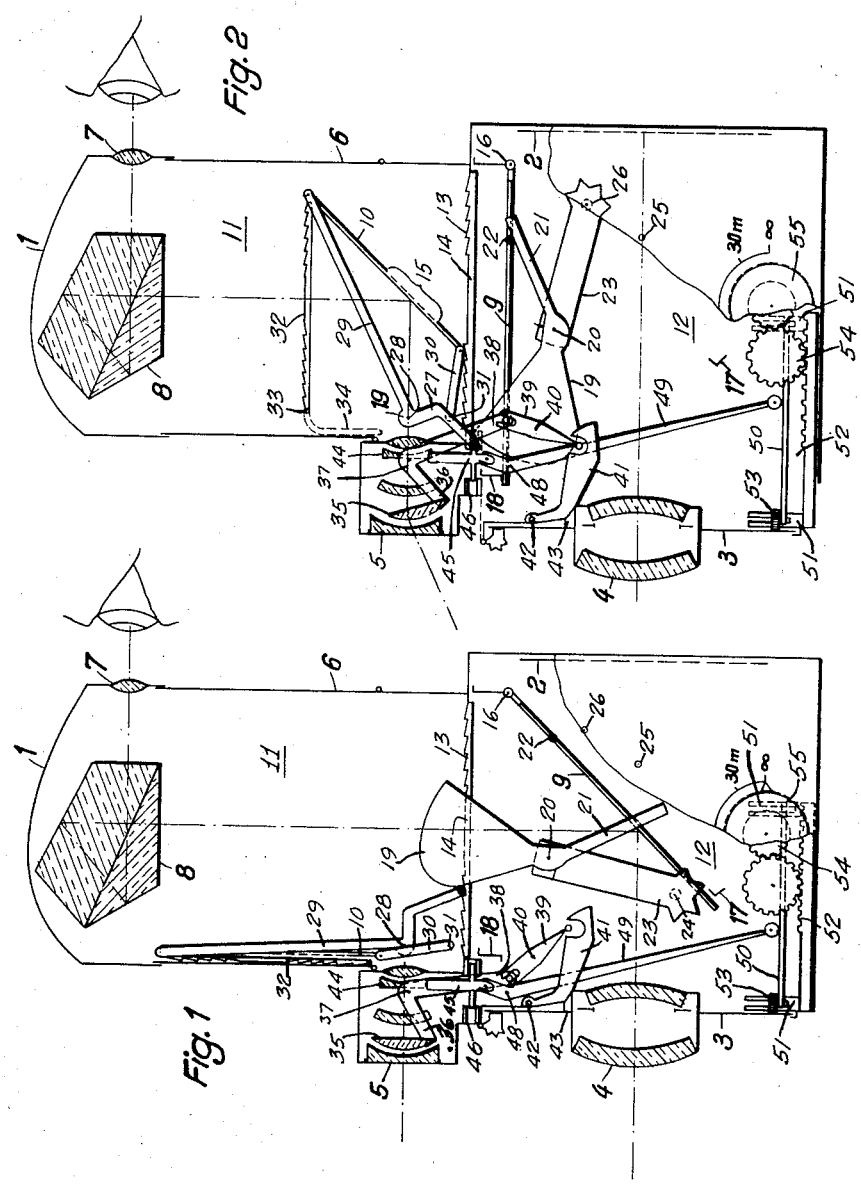

2,854,907

REFLEX TYPE CAMERA

Hans Tieck, Wiesbaden, Germany

Application April 19, 1955, Serial No. 502,329

6 Claims. (Cl. 95—44)

The instant invention relates to single objective, mirror reflex cameras, that is, to the type which has a mirror insertable into the path of the light beam used for photographing, by means of which mirror the subject to be photographed may be observed while setting and adjusting the camera.

Single objective, mirror reflex cameras of the prior art have the drawback that after the camera is adjusted and on removal of the mirror from the path of the light beam, further observation of the subject is no longer possible, and hence not at the moment of actual photography. Because of the desire and need for observation particularly while making an exposure, the so-called twin or double objective, mirror reflex cameras have been developed which, in addition to the objective used for photographing, have a second objective, like the photographic objective and of equal power, for use in observing, the observation mirror being disposed in the light beam of the second objective. However, this double objective type of construction for solving the problem not only involves the use of more optical elements but necessarily results in making the camera larger and certainly more expensive.

An object of the instant invention is to provide a single objective reflex camera in which the subject to be photographed can be observed during the actual photography, that is, at the very minute and moment of film exposure.

A further object of the invention is to provide a single objective reflex camera with a second reflex system which may be inserted into the observation portion of the path of the first reflex system but lies out of the photographing portion of the lightbeam path.

Still a further object is to permit the substitution for observation portion of the main beam through the camera objective of a second reflex system before and at the moment of actual picture taking which will give the identical impression of the subject being photographed as when viewed by the reflex system of the main beam.

Still another object is to eliminate the need for two equally powered objectives in reflex cameras while permitting observation of exactly what is being photographed at the exact instant that it is photographed.

Still another object of the invention is positively to couple two reflex systems in a single camera to each other so that when either one is being used, the other one is in an inoperative position not interfering with the one in use.

Still another object is positively to couple two reflex systems in a single camera to each other so that at an intermediate position of the coupling arrangement both reflex systems are operative and permit direct comparison of the images thereof and hence can serve both as the range finder and the focussing arrangement of the camera.

The foregoing, and other, objects and features of the single objective, mirror reflex camera of my invention will be more readily understood from the following description of an illustrative embodiment thereof when read in conjunction with the appended drawing, in which:

Figure 1 is an elevational section from the side, in highly simplified form, through the illustrative embodiment with the reflex system cooperating with the photographic objective of the camera in the observing position;

Figure 2 is such elevational, side section with the auxiliary or second reflex system in the observing position and the main reflex system cooperating with the photographic objective inoperative, and the photographic objective in photographic readiness;

Figure 3 is such elevational side section with the reflex system of the photographic objective and the auxiliary reflex system both in the operative and observing position; and Figure 4 is a schematic of the mechanism for automatically adjusting the focal length of the observing lens system on interchanging the photographic objective.

The camera 1, opposite the light sensitive film or plate 2 insertable thereinto, in its movable front wall 3 supports the photographic objective 4, shown simply as a two-lens objective but which may be any multiple of combination of various lenses as is well known, and above it, an auxiliary observing lens array 5, as hereinafter described in detail. At the upper portion of the rear fixed wall 6, for example, an eyepiece 7 permits observation of the subject to be photographed by means of the prism 8 within the camera and the pivoted mirrors 9 and 10, through the objective 4 and the lens array 5. The prism 8 is of such shape and so disposed that the light in a vertical path upwardly thereto centrally within the camera is substantially totally deflected horizontally through the eyepiece 7.

The interior of the camera is divided into an upper 11 and a lower region 12, divided by a fixed Fresnel lens 13 of which the central area 14 is clear to transmit the reflections from mirror therethrough without distortion into the upper region 11 and to the prism 8. In its central region 15, the mirror 10 is only mirrored half its width, the other half being clear (see Figure 2) in such manner as to permit direct comparison of the images from the observing lens array 5 and from the photographic objective 4, when the two mirrors are in the position shown in Figure 3. It is obvious that in such position of the mirrors, the images are matchable as in the usual range finder by focusing the photographic objective 4, as also in given cases the lens assembly 5, by means of the rack and gearing as below described.

The mirror 9 which cooperates with the photographic objective 4 to form the first, or main, reflex system, is conveniently rotatable at its upper end about a pin or shaft 16 in the rearward, vertically intermediate, region of the camera side walls. A stop 17 limits the counter-clockwise rotation of the mirror 9 about pivot 16 substantially to the reflex operative position of 45 degrees to the axis of the light beam through the objective 4, as shown in Figure 1, while stop 18 limits the clockwise rotation thereof to substantially the horizontal position above such light beam, as shown in Figure 2. The mirror 10, cooperating with the lens array 5 to form the second or auxiliary reflex system, is shown in its inoperative position in Figure 1, and in its interposed and operative position in Figures 2 and 3.

Mirrors 9 and 10 are interconnected by a system of levers of which a plate cam 19 is integral at one end with the rotatable shaft 20 in and through the camera side wall and has extending from such integral end an arm 21 of a length sufficient to pass, between the mirror and the side wall, in the operative position of the mirror as in Figure 1, below the mirror 9, and on rotation of shaft 20 counter-clockwise to engage a pin 22 extending from the side of the mirror near its upper end to carry the mirror to its inoperative position of Figure 2. The end of the shaft 20 extending beyond the exterior of the camera carries an integral actuating arm 23 which can be locked in any one of three positions by engaging a projecting thereof into three detents 24, 25 and 26 in the outer surface of the camera which are so spaced as to correspond with the three desired mirror position combinations shown respectively in Figures 1, 2 and 3. When the arm 23 is at, or engages, either of the detents 24 or 25, the arm 21, it will be noted, has disengaged from the pin 22, and hence the mirror drops about its pivot shaft 16 against the stop 17 to occupy its position of 45 degrees to the axis of the light beam through the objective 4. An angle or bent lever 27 has one end riding continuously in and along the dwell of the cam 19 and its other end integrally connected, at a pivot shaft 28, to the lower end of a straight lever 29 of which the other and upper end is pivotally connected to the upper end of mirror 10. A second straight lever 30 is pivotally connected at one end to the lower end of mirror 10, and at its other end pivots about a pin 31 at a predetermined point in the camera side wall below the observing lens array 5. It will be noted from Figure 1 that the lever 30 is of such length that in the inoperative position of mirror 10, the lower edge of this mirror is above the lens array 5, and that the lever 29 is of such length that in such inoperative position, mirror 10 is substantially vertical. A clear Fresnel lens 32 has its upper end (in Figure 1) pivotally connected to the upper end of mirror 10 and its lower free end has a lug 33 adapted to ride in a formed groove 34 in the camera side wall so that when mirror 10 is in its position of 45 degrees to the light beam through the lens array 5, the Fresnel lens 32 will be horizontally interposed between the mirror 10 and the prism 8.

The lever system just described may be duplicated element for element, except the external actuating arm 23, at both side walls of the camera, or may be at but one side wall with the opposite wall having grooved paths therein coinciding with the paths taken on actuation by pins extending from the mirror sides adjacent such opposite side wall, the pins riding in the grooved paths.

The mode of operation of the lever system follows readily from Figures 1, 2 and 3. With the shaft 20 rotated so that the cam 19 is in the position shown in Figure 1, the arm 21 has released the pin 22 and permitted mirror 9 to pivot, under its own weight, about shaft 16 to the 45 degree position against the stop 17. On rotation of the external actuating arm 23 counterclockwise, the cam 19 will increasingly push the angle lever 27 clockwise about pivot 28, and with lever 29, mirror 10 and lever 30 about pin 31, until the cam riding end of angle lever 27 reaches a predetermined point adjacent the end of the cam dwell where the mirror 10 will be at 45 degrees to the axis of the light beam through the lens array 5. In the meantime, the arm 21 moving sufficiently counterclockwise beyond the detent 25 has engaged the pin 22 and swung the mirror 9 about its pivot 16 into the substantially horizontal position above the light beam through objective 4 and against stop 18. On rotating shaft 20, by means of actuation arm 23, in the opposite direction, the cam riding end of angle lever 27 rotates the lever about its pivot 28, as also the mirror 10 and the lever 30 counterclockwise to restore mirror 10 to its inoperative position of Figure 1. The dwell of cam 19 is of such configuration that only rotation of the actuating arm 23 between detents 25 and 26 will rotate angle lever 27 about its pivot 28, that is mirror 10 will remain in its 45 degree position unchanged for the rotation of actuating arm 23 from detent 24 to 25, and vice versa.

The second or auxiliary reflex system is so constructed as to provide parallax compensation by making one element of the lens array tiltable with respect to the axis thereof and another element thereof axially displaceable. Parallax compensation and correction could also be obtained by making the mirror 10 tiltable. In the embodiment shown and described, the plano-convex lens 35 of the lens array is affixed to one end of arm 36 of an angle lever pivotable about pin 37 intermediate its ends. The other arm 38 of the angle lever is linked to one end of lever 39 which is pivoted on the camera housing at 40. The other end of lever 39 cooperates with a formed lever 41 at one end thereof, the formed lever 41 being pivoted at its other end 42 to the camera housing. Formed lever 41 is held in its engaging position with lever 39 by a support 43 on the interchangeable and slidable front wall 3. Thus the more lens 35 is tilted, the less width thereof is interposed at the optical axis of the lens array 5.

As shown in greater detail in Figure 4, lens 44 of the lens array 5 is carried by a slide 45 guided in the ways 46 cooperatively engaged by the upper and shorter arm 47 of a lever 48 pivoted at 49 on the camera housing. The lower and longer arm of lever 48 is braced at its free end against the spring pressed track 50 supported in the troughs of a pair of spaced vertical forks 51 integral with the horizontal rack 52 connected to the slidable front wall 3. The vertical position of the track 50 in the forks is adjusted by a pressure plate 53 supported on the slidable front wall 3. The rack 52 is driven by the gearing 54 which in turn is actuatable by a knob 55 on the exterior of the camera.

When replacing one photographic objective of a given focal length with another of a different focal length, the support 43 on the appropriate front wall thereof will correspondingly tilt the formed lever 41, and hence the lever system 39, 38 and 36, to tilt the lens 35 in such predetermined amount as to compensate for parallax. The track 50 is adjusted by means of pressure plate 53 to the correct operating position at which the focal length of the lens array 5, by reason of the axial adjustment of lens 44, is rendered compatible with, and conformed to, the focal length of the photographic objective 4.

The above described observation, and comparison, of the images formed by the photographic objective 4 and the lens array 5 not only assures that the subject as observed will correspond exactly to what appears in the photograph, but exact measuring and focusing for the distance involved, as also parallax compensation.

In preparing to take a picture, the mirror 9 is positioned as shown in Figure 1 by rotating the shaft 20 appropriately, and making certain the sensitive layer 2 is covered, the shutter of the photographic objective 4 is opened. By so doing, detailed observation of the subject to be photographed and exact adjustment of the camera is possible. Then the shutter of the photographic objective is closed, and the mirrors 9 and 10 positioned as shown in Figure 2. As follows from the above description, observation of the subject while so doing is not interrupted as now the second reflex system is available for the observation, and the image impression remains unchanged. Hence the camera user can, while maintaining exact camera adjustment, take the picture at exactly the desired moment all the while observing his subject.

It is to be noted that with the camera of my instant invention, composed of simple and cheap materials, continuous observation of the photographic subject is made possible. Ground glass viewing, optical range finding, as well as other focusing adjustments may be performed therewith without having to accept appreciable increase in the size of the camera because of such added features. In view of automatic range finding feature of the instant invention, the usually expensive auxiliary devices are rendered superfluous because optical elements, which are parts of the camera in any event, are used for the range finding and focusing.

What I claim is:

1. A reflex camera including a housing, a photographic objective in the front wall of the housing, a first mirror insertable into the path of light from the objective within the housing at an angle substantially of 45 degrees to the axis of such path, a light prism in the path of light deflected from the first mirror, an eyepiece in the path of light from the prism in the rear wall of the housing, an observing lens in the front wall above the objective and vertically aligned therewith, a second mirror having a semi-transparent central area adapted to be inserted in the path of light through the lens within the housing and adapted on insertion thereinto to deflect the latter light into the same path to the prism as the light deflected from the first mirror, and means coupling the mirrors to each other and adjustably positionable in one of three positions in a first of which the first mirror deflects the light from the objective into the common light path to the prism, in a second of which the second mirror deflects the light from the observing lens into such common light path, and in the third of which both the first mirror deflects the light from the objective and the second mirror the light from the observing lens into such common light path.

2. A reflex camera according to claim 1 in which the coupling means includes a first pivot, a cam having a dwell rotatable about the first pivot at one end, a lever extending from the pivoted cam end to below the first mirror in its inserted position, a second pivot spaced from the first pivot, the upper end of the mirror being rotatable about the second pivot, and an extension on the side of the first mirror adapted upon rotation of the cam and lever in one direction to engage the lever at a predetermined point in its rotation and to swing the first mirror out of the light path within the housing from the photographic objective, and upon such rotation in the opposite direction to release the first mirror to intercept such light path at substantially an angle of 45 degrees to the axis of such light path.

3. A reflex camera according to claim 1 in which the coupling means includes an angle lever, a first straight lever integral at one end to one end of the angle lever, a pivot pin on which the angle lever and the first straight lever are pivoted at their common region, a pivotal connection between the upper end of the first straight lever and the upper end region of the second mirror, a second straight lever shorter than the first straight lever, one end of the second straight lever being pivotally connected to the lower end region of the second mirror, a second pin supported in the side wall of the housing at a point below the lens, the other end of the second straight lever being rotatably supported on the second pin, a plate cam having a dwell on which the other end of the angle lever rides, a rotatable shaft supported in the side wall of the housing below the lens and above the objective, the cam being integrally supported at one end on the rotatable shaft so that upon rotation of the shaft a limited amount in one direction the second mirror is caused to occupy a position in the light beam from the lens substantially of 45 degrees to the axis of such beam, and upon rotation of such shaft such limited amount in the opposite direction the second mirror is swung to a substantially vertical position out of such light beam and above the lens.

4. A reflex camera according to claim 1 in which the photographic objective is adjustable for focusing and the observing lens comprises a plurality of spaced lenses forming an array, a pin in the wall of the housing adjacent to the lens array, a first lever pivoted on the pin and integrally connected at its upper end to the lowermost region of one lens of the array, an extension on the photographic objective adapted to engage the lever and tilt the one lens for shorter distances, a second lever of which one end is resiliently connected to means for focusing the objective, a second pin supported in a side wall of the housing between the horizontal plane through the lens array and that through the objective, the second lever being rotatably supported near its upper end on the second pin, a horizontal slide connected to the upper end of the second lever, and a second lens of the array carried on said slide such that on adjusting the focusing means for shorter distances the second lens is moved along the optical axis of the array accordingly to adjust the focal length of the array.

5. A photographic camera comprising a housing, a photographic objective, a first reflex system including a first mirror adapted to receive light from the objective, a pentagonal prism in the path of the light reflected from the first mirror and an ocular receiving the light from the prism, a viewing lens array consisting of a plurality of air spaced lenses of which a first is tiltable and a second is movable along the axis of the array, a second reflex system consisting of a mirror a central area of which comprises a semi-transparent mirror positioned in the light path from the first mirror to the prism and adapted to receive light from the viewing lens array and to reflect such light to the prism in a path coincident with the light path from the first mirror at the portion thereof from the second mirror to the prism, means for focusing the photographic objective, means coupling the objective focusing means to each of the tiltable first lens and the axially movable second lens of the array to tilt the first lens and to move the second lens in varying amounts in accordance with the adjustment of the focusing means, and positioning means coupled to both mirrors selectively to position the first mirror in light reflecting position with the second mirror removed from the light beam for ground glass viewing, the second mirror in light reflecting position with the first mirror removed from the light path for viewing while photographing, and with both mirrors in the light reflecting position for range finding.

6. A photographic camera according to claim 5 in which the lens array is positioned above and vertically aligned with the photographic objective.

References Cited in the file of this patent

UNITED STATES PATENTS

| | | |
|---|---|---|
| 2,341,410 | Mihalyi | Feb. 8, 1944 |
| 2,355,136 | Bedford | Aug. 8, 1944 |

FOREIGN PATENTS

| | | |
|---|---|---|
| 22,985 | Great Britain | of 1911 |
| 237,214 | Switzerland | Aug. 1, 1945 |